US012695093B2

(12) United States Patent
Dong et al.

(10) Patent No.: US 12,695,093 B2
(45) Date of Patent: Jul. 28, 2026

(54) POSITIVE ELECTRODE COMPOSITE MATERIAL FOR LITHIUM-ION SECONDARY BATTERY AND LITHIUM-ION SECONDARY BATTERY

(71) Applicant: CONTEMPORARY AMPEREX TECHNOLOGY (HONG KONG) LIMITED, Hong Kong (CN)

(72) Inventors: Miaomiao Dong, Ningde City (CN); Shaocong Ouyang, Ningde City (CN); Chenghua Fu, Ningde City (CN); Changfeng Bie, Ningde City (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 733 days.

(21) Appl. No.: 18/066,288

(22) Filed: Dec. 15, 2022

(65) Prior Publication Data

US 2023/0197959 A1 Jun. 22, 2023

Related U.S. Application Data

(63) Continuation of application No. PCT/CN2021/139283, filed on Dec. 17, 2021.

(51) Int. Cl.
| | |
|---|---|
| *H01M 4/62* | (2006.01) |
| *H01M 4/02* | (2006.01) |
| *H01M 4/131* | (2010.01) |
| *H01M 4/136* | (2010.01) |
| *H01M 4/36* | (2006.01) |
| *H01M 4/505* | (2010.01) |
| *H01M 4/525* | (2010.01) |
| *H01M 4/58* | (2010.01) |
| *H01M 10/0525* | (2010.01) |

(52) U.S. Cl.
CPC ............. *H01M 4/62* (2013.01); *H01M 4/131* (2013.01); *H01M 4/136* (2013.01); *H01M 4/364* (2013.01); *H01M 4/505* (2013.01); *H01M 4/525* (2013.01); *H01M 4/5825* (2013.01); *H01M 10/0525* (2013.01); *H01M 2004/028* (2013.01)

(58) Field of Classification Search
CPC ........ H01M 4/62; H01M 4/131; H01M 4/136; H01M 4/364; H01M 4/505; H01M 4/525; H01M 4/5825; H01M 10/0525; H01M 2004/028
See application file for complete search history.

(56) References Cited

U.S. PATENT DOCUMENTS

| | | |
|---|---|---|
| 9,431,675 B2 | 8/2016 | Guerfi et al. |
| 2012/0237833 A1* | 9/2012 | Guerfi ................... H01M 4/366 |
| | | 429/211 |

| | | | |
|---|---|---|---|
| 2013/0084492 A1 | 4/2013 | Yanagita et al. | |
| 2017/0250399 A1* | 8/2017 | Oyama ................ H01M 4/5825 |
| 2018/0138495 A1* | 5/2018 | Solan .................. H01M 4/0483 |
| 2019/0280337 A1* | 9/2019 | Narita ............... H01M 10/0569 |
| 2019/0305363 A1 | 10/2019 | Nozoe et al. | |
| 2020/0127283 A1 | 4/2020 | Araki et al. | |
| 2020/0350582 A1* | 11/2020 | Kim ...................... H01M 4/525 |

FOREIGN PATENT DOCUMENTS

| | | |
|---|---|---|
| CN | 101752563 A | 6/2010 |
| CN | 102306769 A | 1/2012 |
| CN | 103515594 A | 1/2014 |
| CN | 103811727 A | 5/2014 |
| CN | 103840157 A | 6/2014 |
| CN | 107293727 A | 10/2017 |

OTHER PUBLICATIONS

CN107293727A English machine translation (Year: 2025).*
Du et al., "Na3V2(PO4)3 as cathode material for hybrid lithium ion batteries", Sep. 26, 2012, Journal of Power Sources 223, 284-288 (Year: 2012).*
Boyadzhieva et al., "Competitive lithium and sodium intercalation into sodium manganese phospho-olivine NaMnPO4 covered with carbon black", Oct. 12, 2015, RSC Advances, 5, 87694-87705 (Year: 2015).*
International Search Report received in the corresponding International Application PCT/CN2021/139283, mailed Aug. 25, 2022.
Written Opinion rreceived in the corresponding International Application PCT/CN2021/139283, mailed Aug. 25, 2022.
Zheng Jun-Chao et al: "Comparative Investigation of Phosphate-Based Composite Cathode Materials for Lithium-Ion Batteries", Applied Materials & Interfaces, vol. 6, No. 16, Aug. 14, 2014, pp. 13520-13526, XP093108353, US ISSN: 1944-8244, DOI: 10.1021/am502601r.
The extended European search report received in the corresponding European application 21944413.0, mailed Dec. 18, 2023, 9 pages.
English translation of the International Search Report received in the corresponding International Application PCT/CN2021/139283, mailed Aug. 25, 2022.
English translation of the Written Opinion received in the corresponding International Application PCT/CN2021/139283, mailed Aug. 25, 2022.

(Continued)

*Primary Examiner* — Armindo Carvalho, Jr.
(74) *Attorney, Agent, or Firm* — K&L Gates LLP

(57) ABSTRACT

A positive electrode composite material for a lithium-ion secondary battery is provided. In some embodiments, the positive electrode composite material for a lithium-ion secondary battery comprises: a positive electrode active material selected from at least one of a lithium iron phosphate material and a nickel cobalt lithium manganate material; and at least one of compounds represented by $A_a M_b (PO_4)_c X_d$, wherein A is selected from at least one of Li, Na, K, and Ca, M is selected from at least one of V and Mn, X is selected from any one of halogen elements, a, b, and c are each independently selected from an integer from 1 to 6, and d is selected from an integer from 0 to 3.

18 Claims, No Drawings

(56)        References Cited

OTHER PUBLICATIONS

The partial supplemental European search report received in the corresponding European application 21944413.0, mailed Jul. 20, 2023.

* cited by examiner

POSITIVE ELECTRODE COMPOSITE MATERIAL FOR LITHIUM-ION SECONDARY BATTERY AND LITHIUM-ION SECONDARY BATTERY

CROSS-REFERENCE TO RELATED APPLICATIONS

This application is a continuation of International Application No. PCT/CN2021/139283, filed Dec. 17, 2021, and entitled "POSITIVE ELECTRODE COMPOSITE MATERIAL FOR LITHIUM-ION SECONDARY BATTERY AND LITHIUM-ION SECONDARY BATTERY", which is incorporated herein by reference in its entirety.

TECHNICAL FIELD

The present application relates to the technical field of lithium batteries, and particularly relates to a positive electrode composite material for a lithium-ion secondary battery, a positive electrode of a lithium-ion secondary battery, a lithium-ion secondary battery, a battery module, a battery pack, and an electrical apparatus.

BACKGROUND ART

Lithium-ion secondary batteries are widely used in electric vehicles due to high charge-discharge performance, memoryless effects, and environmental friendliness.

Since the lithium-ion secondary batteries generally have poor low-temperature performance, they cannot yet meet application requirements in low-temperature environments. For example, when a lithium iron phosphate secondary battery is applied to an electric vehicle, the discharge curve of the lithium iron phosphate battery is decreased sharply in the voltage plateau at the end of the discharge in a low-temperature environment, and the diffusion resistance of lithium ions at the positive electrode is increased, thus deteriorating the power performance. When the battery is tested in a process under CLTC working conditions (CLTC: China light-duty vehicle test cycle, single test time: 1800 s), and when the discharge power peak is reached at the end of the battery discharge, the battery cannot go beyond the power peak to continue running the CLTC working conditions due to the sharp drop of voltage, thereby resulting in the discharge cut-off and the decrease of the overall discharge capacity of the battery.

Therefore, the low-temperature performance of the lithium-ion secondary battery needs to be improved.

SUMMARY OF THE INVENTION

Various embodiments in accordance with the present disclosure are carried out in view of the above problems, and an objective of the present application is to improve the low-temperature performance of a lithium-ion secondary battery.

In order to achieve the above object, a first aspect of the present application provides a positive electrode composite material for a lithium-ion secondary battery, comprising: a positive electrode active material selected from at least one of a lithium iron phosphate material and a nickel cobalt lithium manganate material; and at least one of compounds represented by $A_aM_b(PO_4)_cX_d$, where A is selected from at least one of Li, Na, K, and Ca, M is selected from at least one of V and Mn, X is selected from any one of halogen elements, a, b, and c are each independently selected from an integer of 1-6, and d is selected from an integer of 0-3.

In the positive electrode composite material for a lithium-ion secondary battery provided in the present application, preferably, when a discharge rate of the lithium-ion secondary battery is 0.33 C, the positive electrode composite material has a reversible charge-discharge plateau in a voltage range of below 3.0 V.

In the positive electrode composite material for a lithium-ion secondary battery provided in the present application, the content of the compounds represented by $A_aM_b(PO_4)_cX_d$ is preferably from 3 wt % to 10 wt % relative to a total of 100 wt % of the positive electrode active material and the compounds represented by $A_aM_b(PO_4)_cX_d$.

In the positive electrode composite material for a lithium-ion secondary battery provided in the present application, the compounds represented by $A_aM_b(PO_4)_cX_d$ are selected from at least one of $Li_3V_2(PO_4)_3$, $Na_3V_2(PO_4)_3$, $K_3V_2(PO_4)_3$, $Li_3V(PO_4)_2$, $Na_3V(PO_4)_2$, $K_3V(PO_4)_2$, $LiMnPO_4$, $NaMnPO_4$, $KMnPO_4$, $Li_2VMn_2(PO_4)_3$, $Na_2VMn_2(PO_4)_3$, $K_2VMn_2(PO_4)_3$, $LiVMn(PO_4)_2$, $NaVMn(PO_4)_2$, $KVMn(PO_4)_2$, $LiVPO_4F$, $CaV_4(PO_4)_6$, $NaVPO_4F$, or $KVPO_4F$.

In the positive electrode composite material for a lithium-ion secondary battery provided in the present application, the lithium iron phosphate material is selected from at least one of $LiFePO_4$, doped $LiFePO_4$, $LiFePO_4$ coated with carbon, or doped $LiFePO_4$ coated with carbon; and the nickel cobalt manganate material is $LiNi_mCo_nMn_{1-m-n}O_2$, where $0.3 \leq m \leq 0.9$, and $0 \leq n \leq 0.3$.

A second aspect of the present application provides a positive electrode of a lithium-ion secondary battery, comprising: a positive electrode current collector and a positive electrode membrane comprising a positive electrode composite material disposed on at least one surface of the positive electrode current collector, the positive electrode composite material being the positive electrode composite material according to the first aspect of the present application.

A third aspect of the present application provides a lithium-ion secondary battery, comprising the positive electrode of the lithium-ion secondary battery in the second aspect of the present application.

A fourth aspect of the present application provides a battery module, comprising the lithium-ion secondary battery in the third aspect of the present application.

A fifth aspect of the present application provides a battery pack, comprising the battery module in the fourth aspect of the present application.

A sixth aspect of the present application provides an electrical apparatus, comprising at least one of the lithium-ion secondary battery in the third aspect of the present application, the battery module in the fourth aspect of the present application, and the battery pack in the fifth aspect of the present application.

Therefore, the positive electrode composite material of the present application can improve the maximum power of the lithium-ion secondary battery under low-temperature conditions in a low state of charge, and improve the discharge capacity and discharge capacity retention rate under high- and low-temperature conditions.

DETAILED DESCRIPTION

In order to make the invention objective, technical solutions, and beneficial technical effects of the present application clearer, the present application will be described in detail below with reference to specific examples. It should be understood that the examples described in the present specification are only for explaining the present application, other than for limiting the present application.

For the sake of brevity, the present application specifically discloses some numerical ranges. However, any lower limit can be combined with any upper limit to form a range not explicitly recited; and any lower limit can be combined with another lower limit to form a range not explicitly recited, and likewise, any upper limit can be combined with any another upper limit to form a range not explicitly recited. Furthermore, every point or single numerical value between the endpoints of a range is included within the range, even if not expressly recited. Therefore, each point or single value may serve as a lower limit or upper limit of itself in combination with any other points or single values or with other lower limits or upper limits to form an unspecified range.

In the description herein, it should be noted that, unless otherwise stated, the "above" and "below" are inclusive of the said numbers, and "more" among "one or more" means two or more than two.

The above summary of the invention of the present application is not intended to describe each disclosed embodiment or every implementation in the present application. The following description illustrates exemplary embodiments in more detail. In various places throughout the present application, guidance is provided through a series of examples, and these examples can be used in various combinations. In various examples, the enumeration merely serves as a representative group, and should not be construed as exhaustive.

A first aspect of the present application relates to a positive electrode composite material for a lithium-ion secondary battery. The positive electrode composite material comprises a positive electrode active material. In the present application, a positive electrode active material for a battery well-known in the art may be used as the positive electrode active material. As an example, the positive electrode active material may comprise at least one of the following materials: an olivine-structured lithium-containing phosphate, a lithium transition metal oxide, and respective modified compounds thereof. These positive electrode active materials may be used alone or in combination of two or more. Preferably, the positive electrode active material is selected from at least one of a lithium iron phosphate material and a nickel cobalt lithium manganate material. The lithium iron phosphate material may be selected from lithium iron phosphate, (e.g., $LiFePO_4$, LFP for short), doped $LiFePO_4$, $LiFePO_4$ coated with carbon, or doped $LiFePO_4$ coated with carbon. The nickel cobalt lithium manganate material may be $LiNi_mCo_nMn_{1-m-n}O_2$, where $0.3 \leq m \leq 0.9$, and $0 \leq n \leq 0.3$, e.g., $LiNi_{1/3}Co_{1/3}Mn_{1/3}O_2$, $LiNi_{0.5}Co_{0.2}Mn_{0.3}O_2$, $LiNi_{0.5}Co_{0.25}Mn_{0.25}O_2$, $LiNi_{0.6}Co_{0.2}Mn_{0.2}O_2$, $LiNi_{0.65}Co_{0.07}Mn_{0.37}O_2$, or $LiNi_{0.8}Co_{0.1}Mn_{0.1}O_2$. However, the present application is not limited to these materials, and other conventional materials that may be used for the positive electrode active materials of a battery may also be used.

In an embodiment, the positive electrode composite material for a lithium-ion secondary battery comprises: a positive electrode active material selected from at least one of a lithium iron phosphate material and a nickel cobalt lithium manganate material; and at least one of compounds represented by $A_aM_b(PO_4)_cX_d$, where A is selected from at least one of Li, Na, K, and Ca, M is selected from at least one of V and Mn, X is selected from any one of halogen elements, a, b, and c are each independently selected from an integer of 1-6, and d is selected from an integer of 0-3.

In accordance with the present disclosure, an appropriate amount of the compounds represented by $A_aM_b(PO_4)_cX_d$ is added to the positive electrode composite material. In the discharge curves of the above added compounds, a reversible charge-discharge plateau can be observed in a low voltage range. After an appropriate amount of such compounds is mixed into the positive electrode composite material of the battery, a voltage plateau of a low voltage level is correspondingly introduced into the overall discharge voltage distribution curve of the battery.

For example, when M in the compounds is a valence-variable element, a reversible charge-discharge plateau is shown in a voltage range of 1.5-2.1V in the discharge curve of discharge at 0.33 C. For a battery comprising the compounds in the positive electrode composite material, due to the presence of the compounds, a low reversible charge-discharge plateau is introduced in the voltage range of 1.5-2.1 V at the end of the discharge in the battery discharge curve. Similarly, when M is a valence-variable element Mn, the reversible charge-discharge plateau in the battery discharge curve ranges from 2.3 to 3.0 V. When M includes both V and Mn, there is correspondingly a plurality of reversible charge-discharge plateaus.

Under low-temperature conditions, at the end of the battery discharge (i.e., in the low state of charge of the battery), when the discharge voltage distribution curve of the battery reaches the end of the high voltage plateau of the positive electrode active material itself and then declines rapidly, the low voltage platform introduced based on the presence of the above additives can slow down the voltage drop trend at the end of the discharge, so that the battery voltage will not drop sharply to the cut-off voltage, which will lead to the discharge cut-off, and facilitates going beyond the power peak when the battery is discharged in a low state of charge. Therefore, in the 1,800 s test time of the CLTC working condition standard, 1 or more CLTC working conditions can be additionally run beyond the power peak at the end of the battery discharge, thereby improving the maximum power, discharge capacity, and discharge capacity retention rate of the battery under low-temperature conditions.

In some embodiments, when a discharge rate is 0.33 C, the positive electrode composite material has a reversible charge-discharge plateau in a voltage range of below 3.0 V.

In some embodiments, relative to the positive electrode active material and the compounds represented by $A_aM_b(PO_4)_cX_d$ totaling 100 wt %, the content of the compounds represented by $A_aM_b(PO_4)_cX_d$ is from 3 wt % to 10 wt %. If the content of the compounds represented by $A_aM_b(PO_4)_cX_d$ is less than 3 wt %, an obvious reversible charge-discharge plateau may not be observed under the low state of charge of the battery due to a very low content, thereby failing to function to slow down the sharp drop of the voltage at the end of the discharge. If the content of the compounds represented by $A_aM_b(PO_4)_cX_d$ is more than 10 wt %, the overall battery capacity may be lowered due to the corresponding reduction of the content of the positive electrode active material.

In some embodiments, the compounds represented by $A_aM_b(PO_4)_cX_d$ are selected from at least one of $Li_3V_2(PO_4)_3$, $Na_3V_2(PO_4)_3$, $K_3V_2(PO_4)_3$, $Li_3V(PO_4)_2$, $Na_3V(PO_4)_2$, $K_3V(PO_4)_2$, $LiMnPO_4$, $NaMnPO_4$, $KMnPO_4$, $Li_2VMn_2(PO_4)_3$, $Na_2VMn_2(PO_4)_3$, $K_2VMn_2(PO_4)_3$, $LiVMn(PO_4)_2$, $NaVMn(PO_4)_2$, $KVMn(PO_4)_2$, $LiVPO_4F$, $CaV_4(PO_4)_6$, $NaVPO_4F$, or $KVPO_4F$.

A second aspect of the present application relates to a positive electrode of a lithium-ion secondary battery, comprising: a positive electrode current collector and a positive electrode membrane comprising the above positive electrode composite material disposed on at least one surface of the positive electrode current collector.

A third aspect of the present application relates to a lithium-ion secondary battery, comprising the positive electrode of the lithium-ion secondary battery in the second aspect of the present application.

The structure and preparation method of the lithium-ion secondary battery according to the present application are well known per se. In general, the lithium-ion secondary battery pack comprises an outer package bag, and a battery cell and an electrolyte solution arranged within the outer package bag, where the battery cell comprises a positive electrode sheet, a negative electrode sheet, and a separator. In the lithium-ion secondary battery according to the present application, the specific types and compositions of the separator and the electrolyte are not specifically limited, and may be selected based on actual requirements. Specifically, the separator may be selected from the group consisting of a polyethylene film, a polypropylene film, a polyvinylidene fluoride film, and a multi-layer composite film thereof.

For the lithium-ion secondary battery of the present application, a lithium salt solution dissolved in an organic solvent is generally used as a non-aqueous electrolyte solution. The lithium salt, for example, is an inorganic lithium salt, such as $LiClO_4$, $LiPF_6$, $LiBF_4$, $LiAsF_6$, or $LiSbF_6$, or is an organic lithium salt, such as $LiCF_3SO_3$, $LiCF_3CO_2$, $Li_2C_2F_4(SO_3)_2$, $LiN(CF_3SO_2)_2$, $LiC(CF_3SO_2)_3$, or $LiC_nF_{2n+1}SO_3$ (n≥2). The organic solvent used in the non-aqueous electrolyte solution is, for example, a cyclic carbonate, such as ethylene carbonate, propylene carbonate, butylene carbonate, or vinylene carbonate; a chain carbonate, such as dimethyl carbonate, diethyl carbonate, or methyl ethyl carbonate; a linear ester, such as methyl propionate; a cyclic ester, such as γ-butyrolactone; a linear ether, such as dimethoxyethane, diethyl ether, diglyme, or triglyme; a cyclic ether, such as tetrahydrofuran or 2-methyltetrahydrofuran; nitriles, such as acetonitrile and propionitrile; or a mixture of these solvents.

The lithium-ion secondary battery of the present application is briefly described below.

First, the positive electrode sheet is prepared in accordance with the conventional method in the art. Generally, in the above positive electrode active material, it is necessary to add a conductive agent (e.g., Super P), a binder (e.g., PVDF), and the like. Other additives may also be added as required. These materials are usually mixed together and dispersed in a solvent (e.g., NMP), fully stirred, then uniformly coated on a positive electrode current collector, and oven dried to obtain a positive electrode sheet. A metal foil such as an aluminum foil or a material such as a porous metal plate may be used as the positive electrode current collector. The aluminum foil is preferably used.

The negative electrode sheet of the present application may be prepared using a well-known method in the art. Usually, the negative active material, an optional conductive agent (e.g., Super P), a binder (e.g., SBR), and other optional additives are mixed together and dispersed in a solvent (e.g., deionized water), fully stirred, then uniformly coated on a negative electrode current collector, and oven dried to obtain a negative electrode sheet containing a negative electrode film layer. A metal foil such as a copper foil or a material such as a porous metal plate may be used as the negative electrode current collector. The copper foil is preferably used.

In the above positive and negative electrode sheets, the proportion of active materials in the positive and negative electrode film layers should not be very low, otherwise the capacity will be very low; the proportion of active materials should not be very high, otherwise the conductive agent and the binder will be decreased, and the conductivity of the electrode sheets and the degree of adhesion to the current collectors will be decreased, thereby further reducing the electrical performance of the battery cell.

When preparing the positive and negative electrode sheets, the current collector may be coated on both sides or be coated on a single side.

Finally, the positive electrode film layer, the separator, and the negative electrode film layer are stacked in sequence, so that the separator is located between the positive and negative electrode film layers to function for separation, and then winded to obtain a bare battery cell. The bare battery cell is placed in an outer package, and dried. Then, the electrolyte solution is injected, and the lithium-ion secondary battery is obtained through the processes, such as vacuum encapsulation, standing still, chemical formation, and shaping.

Other aspects of the present application relate to a battery module, a battery pack, and an electrical apparatus. The lithium-ion secondary battery of the present application can form a battery module, and the battery module can form a battery pack. The electrical apparatus comprises at least one of the lithium-ion secondary battery, the battery module, and the battery pack provided in the present application. The lithium-ion secondary battery, the battery module, or the battery pack may be used as a power source of the electrical apparatus, or may be used as an energy storage unit of the electrical apparatus. The electrical apparatus may include, but is not limited to, a mobile device (e.g., a mobile phone, a tablet computer, and a laptop), an electric vehicle (e.g., an all-electric vehicle, a hybrid electric vehicle, a plug-in hybrid electric vehicle, an electric bicycle, an electric scooter, an electric golf cart, and an electric truck), an electric train, a ship and a satellite, an energy storage system, and the like.

EXAMPLES

Examples of the present application are illustrated below. The examples described below are illustrative, are merely used to explain the present application, and should not be construed as limitation on the present application. Where specific techniques or conditions are not specified in the examples, the techniques or conditions described in the literatures of the art or the product specifications are followed. The reagents or instruments used without indication of manufacturers are commercially available conventional products. Various parameters involved in the present specification have well-known general meanings in the art, and may be measured in accordance with well-known methods in the art. For example, the tests may be carried out according to the methods given in the examples of the present application.

In the examples of the present application, a positive electrode sheet is prepared in accordance with a conventional method. The positive electrode sheet comprises a positive electrode composite material, a conductive carbon, and a binder. The positive electrode composite material comprises a positive electrode active material and an additive, where the positive electrode active material is at least one of a lithium iron phosphate material and a nickel cobalt lithium manganate material, the additive is one or more of compounds represented by $A_aM_b(PO_4)_cX_d$, and relative to the positive electrode active material and the compounds represented by $A_aM_b(PO_4)_cX_d$ totaling 100 wt %, the content of the additive is 3-10 wt %. The positive electrode active material accounts for 85% of the total mass of the positive electrode coating, and has a compaction density of 2.4 g/cm$^3$. A lithium-ion secondary battery of a winding structure is prepared and assembled using a conventional graphite negative electrode sheet as the negative electrode, a conventional electrolyte solution (1 mol/L LiPF$_6$ dissolved in an organic solvent (EC/DMC/EMC=1/1/1 (mass ratio))), and a separator (polyethylene film with a thickness of 14 μm) in accordance with a conventional method.

Example 1

LiFePO$_4$ was used as a positive electrode active material, and Li$_3$V$_2$(PO$_4$)$_3$ was used as an additive. Relative to the total weight of the two, the content of LiFePO$_4$ was 97%, and the content of Li$_3$V$_2$(PO$_4$)$_3$ was 3%.

Example 2

LiFePO$_4$ was used as a positive electrode active material, and Li$_3$V$_2$(PO$_4$)$_3$ was used as an additive. Relative to the total weight of the two, the content of LiFePO$_4$ was 95%, and the content of Li$_3$V$_2$(PO$_4$)$_3$ was 5%.

Example 3

LiFePO$_4$ was used as a positive electrode active material, and Li$_3$V$_2$(PO$_4$)$_3$ was used as an additive. Relative to the total weight of the two, the content of LiFePO$_4$ was 90%, and the content of Li$_3$V$_2$(PO$_4$)$_3$ was 10%.

Example 4

LiFePO$_4$ was used as a positive electrode active material, and Li$_3$V$_2$(PO$_4$)$_3$ was used as an additive. Relative to the total weight of the two, the content of LiFePO$_4$ was 98%, and the content of Li$_3$V$_2$(PO$_4$)$_3$ was 2%.

Example 5

LiFePO$_4$ was used as a positive electrode active material, and Li$_3$V$_2$(PO$_4$)$_3$ was used as an additive. Relative to the total weight of the two, the content of LiFePO$_4$ was 88%, and the content of Li$_3$V$_2$(PO$_4$)$_3$ was 12%.

Example 6

LiFePO$_4$ was used as a positive electrode active material, and LiMnPO$_4$ was used as an additive. Relative to the total weight of the two, the content of LiFePO$_4$ was 95%, and the content of LiMnPO$_4$ was 5%.

Example 7

LiFePO$_4$ was used as a positive electrode active material, and KVMn(PO$_4$)$_2$ was used as an additive. Relative to the total weight of the two, the content of LiFePO$_4$ was 95%, and the content of KVMn(PO$_4$)$_2$ was 5%.

Example 8

LiFePO$_4$ was used as a positive electrode active material, and NaVPO$_4$F was used as an additive. Relative to the total weight of the two, the content of LiFePO$_4$ was 95%, and the content of NaVPO$_4$F was 5%.

Example 9

LiFePO$_4$ was used as a positive electrode active material, and CaV$_4$(PO$_4$)$_6$ was used as an additive. Relative to the total weight of the two, the content of LiFePO$_4$ was 95%, and the content of CaV$_4$(PO$_4$)$_6$ was 5%.

Example 10

LiNi$_{0.65}$Co$_{0.07}$Mn$_{0.37}$O$_2$ was used as a positive electrode active material, and Li$_3$V$_2$(PO$_4$)$_3$ was used as an additive. Relative to the total weight of the two, the content of LiNi$_{0.65}$Co$_{0.07}$Mn$_{0.37}$O$_2$ was 95%, and the content of Li$_3$V$_2$(PO$_4$)$_3$ was 5%.

Example 11

LiNi$_{0.65}$Co$_{0.07}$Mn$_{0.37}$O$_2$ was used as a positive electrode active material, and NaMnPO$_4$ was used as an additive. Relative to the total weight of the two, the content of LiNi$_{0.65}$Co$_{0.07}$Mn$_{0.37}$O$_2$ was 95%, and the content of NaMnPO$_4$ was 5%.

Example 12

LiNi$_{0.65}$Co$_{0.07}$Mn$_{0.37}$O$_2$ was used as a positive electrode active material, and Li$_2$VMn$_2$(PO$_4$)$_3$ was used as an additive. Relative to the total weight of the two, the content of LiNi$_{0.65}$Co$_{0.07}$Mn$_{0.37}$O$_2$ was 95%, and the content of Li$_2$VMn$_2$(PO$_4$)$_3$ was 5%.

Example 13

LiNi$_{0.65}$Co$_{0.07}$Mn$_{0.37}$O$_2$ was used as a positive electrode active material, and KVPO$_4$F was used as an additive. Relative to the total weight of the two, the content of LiNi$_{0.65}$Co$_{0.07}$Mn$_{0.37}$O$_2$ was 95%, and the content of KVPO$_4$F was 5%.

Example 14

LiNi$_{0.65}$Co$_{0.07}$Mn$_{0.37}$O$_2$ was used as a positive electrode active material, and CaV$_4$(PO$_4$)$_6$ was used as an additive. Relative to the total weight of the two, the content of LiNi$_{0.65}$Co$_{0.07}$Mn$_{0.37}$O$_2$ was 95%, and the content of CaV$_4$(PO$_4$)$_6$ was 5%.

Example 15

A mixture of LiFePO$_4$ and LiNi$_{0.65}$Co$_{0.07}$Mn$_{0.37}$O$_2$ at a weight ratio of 1:1 was used as a positive electrode active material, and Li$_3$V$_2$(PO$_4$)$_3$ was used as an additive. Relative to the total weight of the two, the content of the mixture of LiFePO$_4$ and LiNi$_{0.65}$Co$_{0.07}$Mn$_{0.37}$O$_2$ was 95%, and the content of Li$_3$V$_2$(PO$_4$)$_3$ was 5%.

Comparative Example 1

LiFePO$_4$ was used as a positive electrode active material, which was free from an additive.

Comparative Example 2

LiNi$_{0.65}$Co$_{0.07}$Mn$_{0.37}$O$_2$ was used as a positive electrode active material, which was free from an additive.

[Battery Cell Performance Test and Low-Temperature Performance Test of Lithium-Ion Secondary Battery]

The battery cells of Examples 1-15 and Comparative Examples 1-2 were tested, and the corresponding low-temperature performance was tested, in accordance with the test methods as follows.

(1) Battery Cell Performance Test

The battery capacity was tested at 25° C. as follows: the battery was left to stand still in an environment at 25° C. until the battery temperature was constant at 25° C.; charged at a current of ⅓ C to a charge cut-off voltage (3.65V when the positive electrode active material was $LiFePO_4$; and 4.35V when the positive electrode active material was $LiNi_{0.65}Co_{0.07}Mn_{0.37}O_2$ or a mixture of $LiFePO_4$ and $LiNi_{0.65}Co_{0.07}Mn_{0.37}O_2$); left to stand still for 10 min; charged at a current of 0.05 C to a charge cut-off voltage; left to stand still for 10 min; and discharged at a current of ⅓ C to a discharge cut-off voltage, where the discharge capacity in this step was denoted as a battery discharge capacity Cn at 25° C. @0.33 C.

The plateau voltage was determined as follows: a discharge curve was obtained based on discharge data, and the plateau voltage displayed by the additive in the lithium iron phosphate or nickel cobalt lithium manganate system in the corresponding examples/comparative examples was determined by observation of the curve.

(2) Low-Temperature Performance Test

The maximum power in 20% SOC @−7° C. in 30 s was tested as follows: ① the battery was left to stand still in an environment at 25° C. until the battery temperature was constant at 25° C.; ② the battery was charged at a current of ⅓ C to a charge cut-off voltage; ③ the battery was left to stand still for 10 min; ④ the battery was charged at a constant of 0.05 C to a charge cut-off voltage; ⑤ the battery was left to stand still for 10 min; ⑥ the battery was discharged at a current of ⅓ C to 0.8 Cn, to adjust the state of charge to 20% SOC; ⑦ the battery was left to stand still in an environment at −7° C. until the battery temperature was constant at −7° C.; 8 the battery was discharged at a specific power for 30 s to a discharge cut-off voltage, where the discharge capacity in this step was denoted as C1; ⑨ the battery was left to stand still for 5 min; and ⑩ if the voltage in step ⑧ reached the discharge cut-off voltage, this power was denoted as the maximum power; if the voltage in step ⑧ did not reach the discharge cut-off voltage, or the duration for reaching the discharge cut-off voltage was less than 30 s, the battery was charged and discharged at a current of 0.05 C by a capacity identical to the capacity of C1, i.e., the state of charge of the battery was readjusted to 20% SOC; and the discharge in step ⑧ was repeated after increasing/decreasing the power accordingly, until the battery was discharged to the discharge cut-off voltage in 30 s, where the power in this case was denoted as the maximum power.

The actual discharge capacity of the battery cell was tested in CLTC at −7° C. as follows: the battery was left to stand still in an environment at 25° C. until the battery temperature was constant at 25° C.; charged at a current of ⅓ C to a charge cut-off voltage; left to stand still for 10 min; charged at a current of 0.05 C to a charge cut-off voltage; left to stand still for 10 min; left to stand still in an environment at −7° C. until the battery temperature was constant at −7° C.; and discharged in a process under CLTC working conditions of the battery cell to a discharge cut-off voltage, where the discharge capacity in this step was denoted as the actual discharge capacity of the battery at −7° C.

Calculation of the discharge capacity retention rate of the battery cell in CLTC at −7° C.: (actual discharge capacity in CLTC at −7° C./Ah) divided by (discharge capacity at 25° C./Ah @0.33 C) to obtain the discharge capacity retention rate of the battery cell in CLTC at −7° C.

[Analysis of Test Results]

The test results of Examples 1-15 and Comparative Examples 1-2 are shown in Table 1.

Referring to Table 1, as can be seen from the performance test results in Examples 1-15 and Comparative Examples 1-2, the voltage plateaus displayed by the additive containing a valence-variable element (V and/or Mn) can be observed on the discharge curve, and the voltage plateaus includes a voltage plateau of below 3.0 V, i.e., a low-voltage plateaus.

As can be seen from the comparison of batteries of the lithium iron phosphate system in Examples 1-3 and 5-9 and in Comparative Example 1, compared with the battery free from an additive in Comparative Example 1, the additive in Examples 1-3 and 5-9 replaces the positive electrode active material LiFePO4 of a corresponding content, thus correspondingly reducing the discharge capacity at room temperature (25° C.), but the presence of the additive obviously improves the maximum power of the battery in a low state of charge (20% SOC) in a low-temperature environment (−7° C.), and the actual discharge capacity and discharge capacity retention rate under CLTC working conditions.

Similarly, as can also be seen from the comparison of batteries of the nickel cobalt lithium manganate system in Examples 10-14 and in Comparative Example 2, the use of the additive obviously improves the maximum power of the battery in a low state of charge (20% SOC) in a low-temperature environment (−7° C.), and the actual discharge capacity and discharge capacity retention rate under CLTC working conditions.

In addition, as can be seen from Example 15, the positive electrode active material may be a mixed system of lithium iron phosphate and nickel cobalt lithium manganate. Compared with Comparative Example 1 and Comparative Example 2 where the battery is free from an additive, the presence of the additive also improves the low-temperature performance of the battery.

As can be seen from further comparison of Examples 1 to 5, when the content of the additive in the positive electrode composite material is 2 wt % (Example 4), a relatively large amount (98 wt %) of the positive electrode active material is contained, such that the discharge capacity at room temperature (25° C.) is relatively high; however, due to the low additive content, the maximum power in a low state of charge (20% SOC) in a low-temperature environment (−7° C.), and the actual discharge capacity and discharge capacity retention rate under CLTC working conditions are poorer than the performances in Examples 1 to 3 where the additive content is 3-10 wt %, and therefore, the additive content of 2 wt % is not preferred.

When the additive content in the positive electrode composite material is 12 wt % (Example 5), it can be seen that the presence of the additive has the effects of improving the maximum power in a low state of charge (20% SOC) in a low-temperature environment (−7° C.), and the actual discharge capacity and discharge capacity retention rate under CLTC working conditions; however, due to the high additive content, the content of the positive electrode active material is relatively decreased (88 wt %), thus decreasing the discharge capacity at room temperature (25° C.), and therefore, the additive content of 12 wt % is not preferred, either.

The preferred content range of the additive in the present application is 3-10 wt %. Referring to Examples 1-3, where the additive content not only can improve the power characteristics in a low state of charge in a low-temperature environment, and improve the actual discharge capacity and discharge capacity retention rate under CLTC working conditions, but also will not decrease the discharge capacity of the battery at room temperature.

It should be noted that the present application is not limited to the above embodiments. The above-described embodiments are merely exemplary, and embodiments having substantially the same technical idea and the same effects within the scope of the technical solution of the present application are all included in the technical scope of the present application. In addition, without departing from the scope of the subject matter of the present application, various modifications that can be conceived by those skilled in the art are applied to the embodiments, and other modes constructed by combining some of the constituent elements of the embodiments are also included in the scope of the present application.

secondary battery is 0.33 C, the positive electrode composite material has a reversible charge-discharge plateau in a voltage range of below 3.0 V.

3. The positive electrode composite material according to claim 1, wherein a content of the at least one compound represented by $A_aM_b(PO_4)_cX_d$ is from 3 wt % to 10 wt % relative to a total of 100 wt % of the positive electrode active material and the compounds represented by $A_aM_b(PO_4)_cX_d$.

4. The positive electrode composite material according to claim 1, wherein the lithium iron phosphate material is selected from at least one of $LiFePO_4$, doped $LiFePO_4$, $LiFePO_4$ coated with carbon, or doped $LiFePO_4$ coated with carbon.

5. The positive electrode composite material according to claim 1, wherein the nickel cobalt lithium manganate material is $LiNi_mCo_nMn_{1-m-n}O_2$, wherein $0.3 \leq m \leq 0.9$, and $0 \leq n \leq 0.3$.

6. A positive electrode of a lithium-ion secondary battery, wherein the positive electrode comprises:

a positive electrode current collector and a positive electrode membrane comprising a positive electrode com-

TABLE 1

| | | | | | Battery cell performance | | Low-temperature performance | | |
| | Positive electrode active material | | Compounds represented by $A_aM_b(PO_4)_cX_d$ | | Discharge | | Maximum power in 20% SOC in 30 s @ −7° C. | Actual discharge capacity in CLTC at −7° C./ $^{Ah}$ | Discharge capacity rentention rate in CLTC at −7° C. @ −7° C. |
| No. | Composition | Content (Weight percent) | Composition | Content (Weight percent) | capacity at 25° C./ Ah@0.33 C. | Additive display plateau | | | |
|---|---|---|---|---|---|---|---|---|---|
| Example 1 | $LiFePO_4$ | 97% | $Li_3V_2(PO_4)_3$ | 3% | 189.6 | 1.9 V, 3.6 V | 1129 | 151.7 | 80.0% |
| Example 2 | $LiFePO_4$ | 95% | $Li_3V_2(PO_4)_3$ | 5% | 187.3 | 1.9 V, 3.6 V | 1203 | 154.1 | 82.3% |
| Example 3 | $LiFePO_4$ | 90% | $Li_3V_2(PO_4)_3$ | 10% | 182.1 | 1.9 V, 3.6 V | 1354 | 153.7 | 84.4% |
| Example 4 | $LiFePO_4$ | 98% | $Li_3V_2(PO_4)_3$ | 2% | 190.2 | 1.9 V, 3.6 V | 1110 | 145.3 | 76.4% |
| Example 5 | $LiFePO_4$ | 88% | $Li_3V_2(PO_4)_3$ | 12% | 179.8 | 1.9 V, 3.6 V | 1480 | 151.0 | 84.0% |
| Example 6 | $LiFePO_4$ | 95% | $LiMnPO_4$ | 5% | 187.8 | 2.7 V | 1387 | 157.0 | 83.6% |
| Example 7 | $LiFePO_4$ | 95% | $KVMn(PO_4)_2$ | 5% | 187.4 | 1.6 V, 2.4 V, 3.3 V | 1567 | 158.9 | 84.8% |
| Example 8 | $LiFePO_4$ | 95% | $NaVPO_4F$ | 5% | 188.4 | 1.6 V, 3.3 V | 1213 | 156.4 | 83.0% |
| Example 9 | $LiFePO_4$ | 95% | $CaV_4(PO_4)_6$ | 5% | 187 | 1.6 V, 3.3 V | 1243 | 156.3 | 83.6% |
| Example 10 | $LiNi_{0.65}Co_{0.07}Mn_{0.37}O_2$ | 95% | $Li_3V_2(PO_4)_3$ | 5% | 230.5 | 1.9 V, 3.6 V | 1235 | 203.8 | 88.4% |
| Example 11 | $LiNi_{0.65}Co_{0.07}Mn_{0.37}O_2$ | 95% | $NaMnPO_4$ | 5% | 232 | 2.4 V | 1392 | 206.5 | 89.0% |
| Example 12 | $LiNi_{0.65}Co_{0.07}Mn_{0.37}O_2$ | 95% | $Li_3VMn_2(PO_4)_3$ | 5% | 231.4 | 1.9 V, 2.7 V, 3.6 V | 1582 | 206.4 | 89.2% |
| Example 13 | $LiNi_{0.65}Co_{0.07}Mn_{0.37}O_2$ | 95% | $KVPO_4F$ | 5% | 231.9 | 1.6 V, 3.3 V | 1238 | 205.7 | 88.7% |
| Example 14 | $LiNi_{0.65}Co_{0.07}Mn_{0.37}O_2$ | 95% | $CaV_4(PO_4)_6$ | 5% | 230.5 | 1.6 V, 3.3 V | 1263 | 203.3 | 88.2% |
| Example 15 | $LiFePO4 + LiNi_{0.65}Co_{0.07}Mn_{0.37}O_2$ | 95% | $Li_3V_2(PO_4)_3$ | 5% | 202.1 | 1.9 V, 3.6 V | 1210 | 171.4 | 84.8% |
| Comparative example 1 | $LiFePO_4$ | 100% | none | / | 192.5 | / | 1108 | 146.7 | 76.2% |
| Comparative example 2 | $LiNi_{0.65}Co_{0.07}Mn_{0.37}O_2$ | 100% | none | / | 237.1 | / | 1148 | 189.9 | 80.1% |

What is claimed is:

1. A positive electrode composite material for a lithium-ion secondary battery, wherein the positive electrode composite material comprises:

a positive electrode active material selected from at least one of a lithium iron phosphate material and a nickel cobalt lithium manganate material; and at least one compound represented by $A_aM_b(PO_4)_cX_d$, wherein A is selected from at least one of Li, Na, K, and Ca, M is selected from at least one of V and Mn, X is selected from any one of halogen elements, a, b, and c are each independently selected from an integer of 1-6, and d is selected from an integer of 0-3, wherein the at least one compound represented by $A_aM_b(PO_4)_cX_d$ comprises $CaV_4(PO_4)_6$.

2. The positive electrode composite material according to claim 1, wherein when a discharge rate of the lithium-ion posite material disposed on at least one surface of the positive electrode current collector, the positive electrode composite material being the positive electrode composite material according to claim 1.

7. A lithium-ion secondary battery, comprising the positive electrode of the lithium-ion secondary battery according to claim 6.

8. A battery module, comprising the lithium-ion secondary battery according to claim 7.

9. A battery pack, comprising the battery module according to claim 8.

10. An electrical apparatus, comprising at least one of the lithium-ion secondary battery according to claim 7.

11. The positive electrode composite material according to claim 1, wherein the at least one compound represented by $A_aM_b(PO_4)_cX_d$ further comprises at least one of $K_3V_2(PO_4)_3$, $Na_3V(PO_4)_2$, and $K_3V(PO_4)_2$.

12. The positive electrode composite material according to claim 1, wherein the at least one compound represented by $A_aM_b(PO_4)_cX_d$ further comprises at least one of $NaVPO_4F$, and $KVPO_4F$.

13. A positive electrode composite material for a lithium-ion secondary battery, wherein the positive electrode composite material comprises:

a positive electrode active material comprising a lithium iron phosphate material selected from at least one of $LiFePO_4$, doped $LiFePO_4$, $LiFePO_4$ coated with carbon, and doped $LiFePO_4$ coated with carbon; and at least one compound comprises $CaV_4(PO_4)_6$, wherein a content of the at least one compound is from 3 wt % to 10 wt % relative to a total of 100 wt % of the positive electrode active material and the at least one compound.

14. The positive electrode composite material according to claim 13, wherein the positive electrode active material further comprises a nickel cobalt lithium manganate material, the nickel cobalt lithium manganate material is $LiNi_mCo_nMn_{1-m-n}O_2$, wherein $0.3 \leq m \leq 0.9$, and $0 \leq n \leq 0.3$.

15. The positive electrode composite material according to claim 14, wherein the nickel cobalt lithium manganate material is $LiNi_{0.65}Co_{0.07}Mn_{0.37}O_2$.

16. A positive electrode composite material for a lithium-ion secondary battery, wherein the positive electrode composite material comprises:

a positive electrode active material comprising a nickel cobalt lithium manganate material, the nickel cobalt lithium manganate material is $LiNi_mCo_nMn_{1-m-n}O_2$, wherein $0.3 \leq m \leq 0.9$, and $0 \leq n \leq 0.3$; and at least one compound comprises $CaV_4(PO_4)_6$, wherein a content of the at least one compound is from 5 wt % to 10 wt % relative to a total of 100 wt % of the positive electrode active material and the at least one compound.

17. The positive electrode composite material according to claim 16, wherein the positive electrode active material further comprises a lithium iron phosphate material selected from at least one of $LiFePO_4$, doped $LiFePO_4$, $LiFePO_4$ coated with carbon, and doped $LiFePO_4$ coated with carbon.

18. The positive electrode composite material according to claim 17, wherein the nickel cobalt lithium manganate material is $LiNi_{0.65}Co_{0.07}Mn_{0.37}O_2$, the positive electrode active material further is $LiFePO_4$.

* * * * *